United States Patent [19]
Onvural et al.

[11] Patent Number: 5,995,570
[45] Date of Patent: Nov. 30, 1999

[54] RECOVERING A CLOCK SIGNAL IN A MULTIMEDIA NETWORK USING TIME STAMPS

[75] Inventors: Raif O. Onvural, Cary; Gerald Arnold Marin, Chapel Hill, both of N.C.

[73] Assignee: International Business Machines Corporation, Armonk, N.Y.

[21] Appl. No.: 08/883,285

[22] Filed: Jun. 27, 1997

[51] Int. Cl.[6] ............................................. H04L 7/00
[52] U.S. Cl. ................................... 375/356; 370/503
[58] Field of Search .................................. 375/354, 356, 375/362; 370/350, 503, 507, 509; 395/551, 553, 558, 559; 327/141

[56] References Cited

U.S. PATENT DOCUMENTS

| | | | |
|---|---|---|---|
| 4,366,558 | 12/1982 | Homma et al. | 365/189 |
| 4,596,026 | 6/1986 | Cease et al. | 375/118 |
| 4,608,669 | 8/1986 | Klara et al. | 365/201 |
| 5,001,730 | 3/1991 | Franaszek et al. | 375/107 |
| 5,007,070 | 4/1991 | Chao et al. | 375/118 |
| 5,260,978 | 11/1993 | Fleischer et al. | 375/106 |
| 5,272,728 | 12/1993 | Ogawa | 375/110 |
| 5,323,426 | 6/1994 | James et al. | 375/118 |
| 5,384,697 | 1/1995 | Pascucci | 364/139 |
| 5,384,906 | 1/1995 | Horst | 395/553 |
| 5,394,395 | 2/1995 | Nagai et al. | 370/60 |
| 5,459,851 | 10/1995 | Nakajima et al. | 395/476 |

FOREIGN PATENT DOCUMENTS 5037560  2/1993  Japan .
6303254  10/1994  Japan .

OTHER PUBLICATIONS

"B–ISDN ATM Adaptation Layer (AAL) Specification," *Integrated Services Digital Network (ISDN) Overall Network Aspects and Functions*, International Telecommunication Union, ITU–T Recommendation I.363, Mar., 1993.

"Enabling ATM Networks," *IBM Systems Journal*, vol. 34, No. 4, 1995, pp. 672–693.

"Proposal of Mechanism for Source Clock Recovery through Asynchronous Network," *IBM Technical Bulletin*, vol. 37, No. 7, Jul., 1994, pp. 401–407.

"The Asynchronous Transfer Mode: A tutorial," IBM Research Division, Zurich Research Laboratory, May 30, 1991.

*Primary Examiner*—Temesghen Ghebretinsae
*Attorney, Agent, or Firm*—John J. Timar; Winstead, Sechrest & Minick

[57] ABSTRACT

An apparatus and method allow two or more members of a network, connected in multipoint-multipoint manner, to synchronize their local service clocks. Overall synchronization is achieved as soon as every member within the network transports its own timing information to other members of the group, plus the maximum propagation delay between the group members, and accordingly minimizes the possibility of overruns and underruns at each node end. Such synchronization is implemented when all members of a network synchronize their internal clocks to a lowest clock frequency within the network.

20 Claims, 9 Drawing Sheets

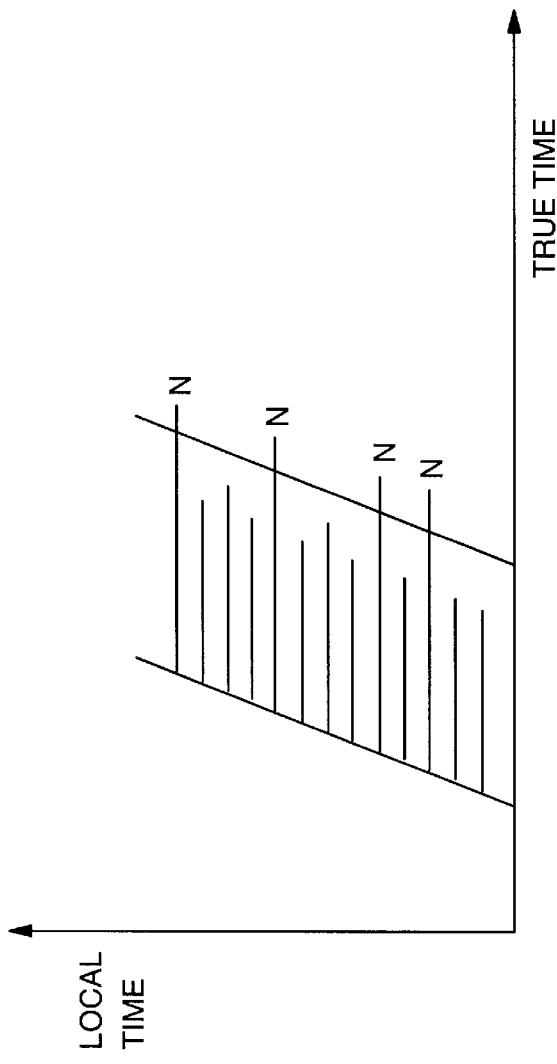
FIG. 1-A
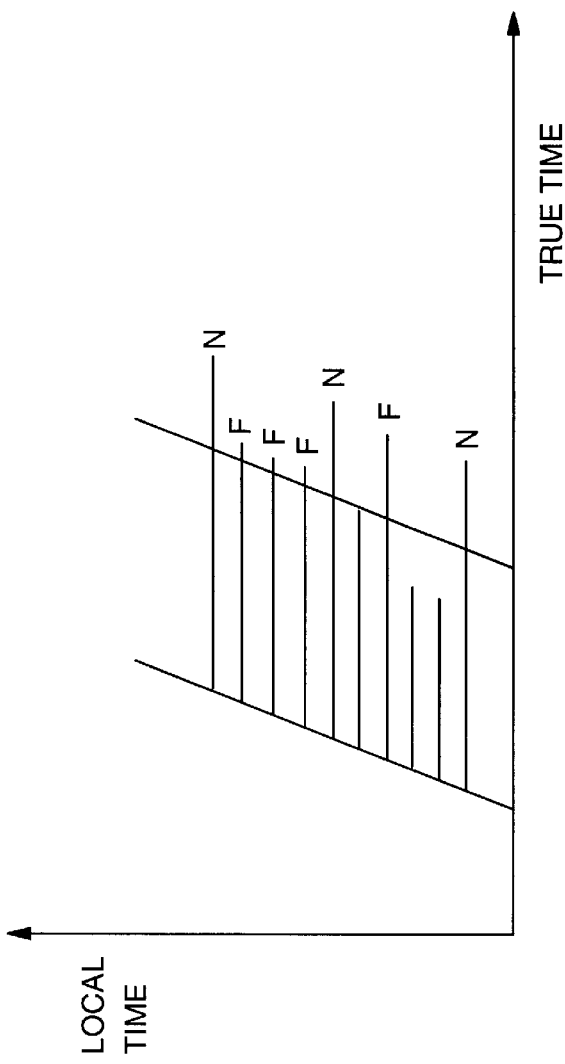
FIG. 1-B

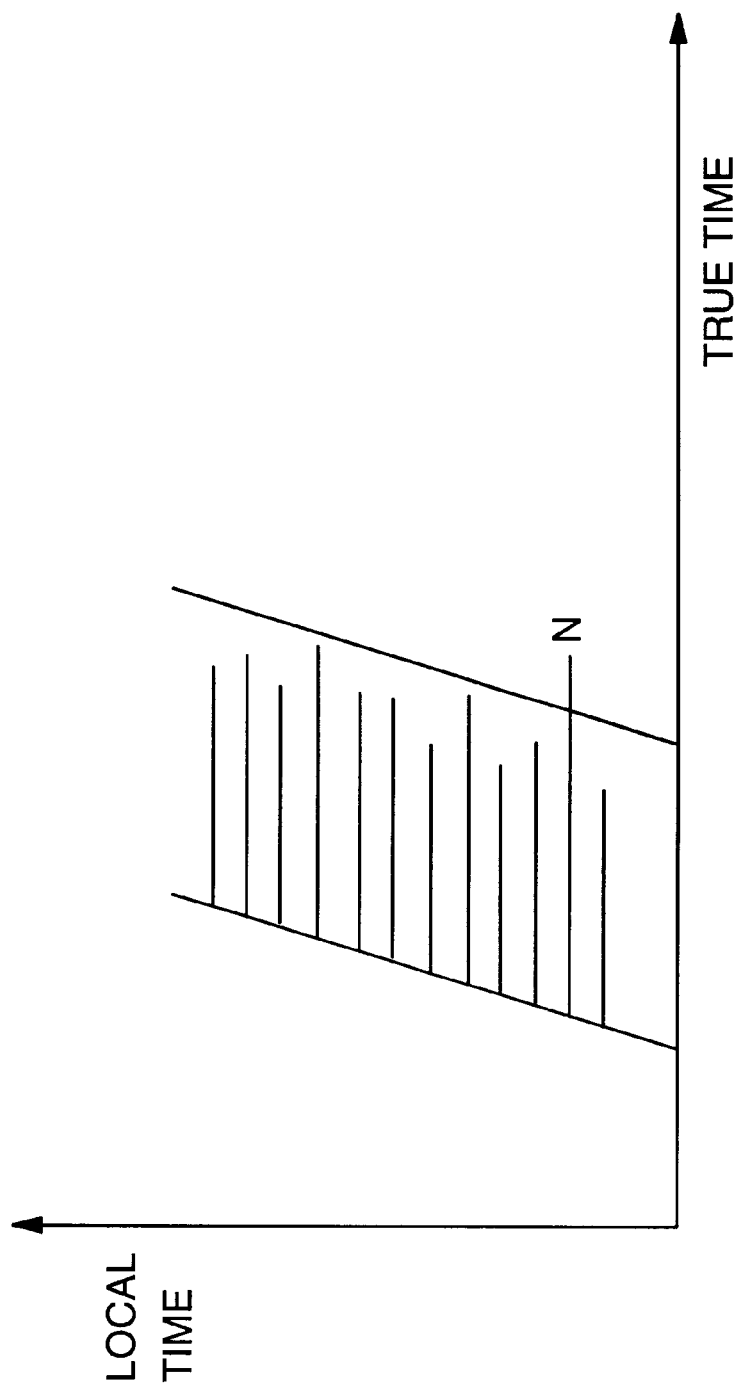
FIG. 1-C

RECOVERING A CLOCK SIGNAL IN A MULTIMEDIA NETWORK USING TIME STAMPS

TECHNICAL FIELD

The present invention relates in general to a multimedia network, and in particular, to a clock recovery mechanism in a multimedia network.

BACKGROUND INFORMATION

The term "multimedia" is used to refer to the concurrent presentation of one or more applications, such as voice, video, data, and image programs. Multimedia networks integrate different types of applications in a same network to provide a basic framework for nodes within the network to exchange different types of information. These networks also support multimedia applications which require the integration of some combination of text, image, voice, and video programs in a single application. Examples of integrated multimedia applications include teleconferencing, entertainment video, medical imaging, advertising, and education.

Multimedia applications differ from uni-media applications in varied manners. Typically, multimedia applications are used within a group involving more than two users. Moreover, communication within the group is symmetric. Stated another way, any member of the group can send information to any other group member in multimedia applications. Additionally, in multimedia applications, there are requirements for synchronization among the various information types, which can range from course synchronization to fine synchronization. Course synchronization includes sequencing the transmission of various objects (i.e., an image followed by a voice followed by image and so on). Moreover, the more precise fine synchronization includes synchronization of a voice to a speaker's lip motion, among others.

In multimedia networks, real-time applications require local service clocks to be synchronized to one another. Clock synchronization has been studied in detail for point-to-point connections. Basically, two techniques have been developed for clock synchronization in such connections. These two techniques include a buffer filling technique and a time stamp technique. However, while the problem of clock synchronization has been studied for point-to-point connections, this issue has not been satisfactorily addressed in multipoint-multipoint connections, in which more than two users are involved in exchanging information. In multipoint-multipoint connections, an asynchronous local service clock is typically found at each of the end nodes within a network. With such asynchronous local service clocks at each end node, clock frequencies at different nodes in the communication network may not be the same, unless mechanisms are implemented to achieve this similarity. Such similarity is generally required as unsynchronized clocks cause the receiver to expect data at a faster or slower rate than the data is actually being transmitted at. For example, in FIG. 1-A, receiver and sender clocks have the same frequencies. Therefore, packets delayed by the network beyond acceptable levels, marked "n," are dropped at a specified time. In contrast, in FIG. 1-B, a receiving clock is faster than a sending clock. In this situation, packets which would otherwise be acceptable, are dropped as the receiver expects the packets (marked "f") at a faster rate than they arrive. Lastly, when the receiving clock is slower than the sending clock, as in FIG. 1-C, too much time is allowed at the receiver. Consequently, there is an increased probability that the receiver buffer will become full when the receiver has the slower clock. Eventually, when the receiver buffer becomes full, there is a quality degradation due to lost packets at the end node.

Similar issues were encountered with point-to-point connections in a communication network. A buffer filling technique has been used with point-to-point connections to ensure that sending and receiving nodes of a network communicate at substantially the same clock speed. In the buffer filling technique, a local clock is reconstructed by measuring a filling level of a packet buffer within the receiving node. The data values are delivered from the buffer to a terminal at a rate determined by a local clock, generated by a phase locked loop (PLL). If the buffer tends to overflow, then the PLL provides a local clock at a higher frequency. Conversely, when the buffer tends to underflow, the PLL is able to provide the local clock signal at a slower frequency. To assure that the buffer does not underflow when a first set of data packets arrive, the buffer must be filled to a certain level before the receiver node may start operating and receive data. It should be noted that the buffer filling technique described above is sensitive to jitter and, therefore, a fluctuation in the filling level of the buffer may result causing constant fluctuation in a clock generated by the PLL. Thus, when buffer filling techniques are utilized, it may be necessary to filter the jitter on the signals provided to the PLL to ensure that a correct output is generated.

A time stamp method is also utilized to reconstruct a local clock in some point-to-point communication systems. The time stamp methodology utilizes special data packets which include clock information pertaining to THE source of the transmitted signal. This methodology is described in greater detail in "Integrated Services Digital Network (ISDN) Overall Network Aspects and Functions, B-ISDN ATM Adapter Layer (AAL) Specification," *ITU-T Recommendation I.363*, published by International Telecommunication Union (ITU-T) Telecommunication Standardization Sector of ITU in March 1993, which is hereby incorporated by reference herein. As set forth in Section 2.5.2.2.1 of that Recommendation, a synchronous residual time stamp (SRTS) method is disclosed. The SRTS method uses the residual time stamp (RTS) to measure and convey information about a frequency difference between the common reference clock derived from the network and a service clock. The same derived network clock is assumed to be available at both the transmitter and the receiver. If the common network reference clock is unavailable (e.g., when working between different networks which are not synchronized), then the asynchronous clock recovery method will be in a special mode of operation.

The basic operation of the SRTS method, as described within the ITU-T recommendation I.363, will be described below. In FIG. 2, the following notations are utilized.

fs—service clock frequency;

fn—network clock frequency (e.g. 155.52 MHz);

fnx—derived network clock frequency, $fnx=fn/x$, where x is an integer to be defined later;

N—period of RTS and cycles of the service clock of frequency fs;

T—period of the RTS in seconds;

M(Mnom, Mmax, Mmin)—number of fnx cycles within a (nominal, maximum, minimum) RTS period; and Mq—largest integer smaller than or equal to M.

During operation, in a fixed duration T measured by N service clock cycles, a number of derived network clock cycles, Mq, is obtained at a transmitter. If Mq is transmitted to the receiver, the service clock of the source can be reconstructed by the receiver since it has the necessary information: fnx, Mq and N. It should be noted that Mq is actually made up of a nominal part and a residual part. The nominal part Mnom corresponds to a nominal number of fnx cycles in T seconds and is fixed for a service. A residual part of Mq conveys frequency difference information as well as an effect of the quantization, and thus may vary. Since a nominal part of Mq is a constant, it may be assumed that the nominal part of Mq is available at a receiver. Therefore, only a residual part of Mq is transmitted to a receiver.

A minimum size of the RTS required to unambiguously represent a residual portion of Mq is a function of N, the ratio of fnx/fs, and the service clock tolerance, ±ε. Let "y" be a difference between Mnom and the maximum or minimum value of N (denoted as Mmax, Mmin). The difference, y, is given by:

$$y = N * fnx/fs * \epsilon. \quad (1)$$

In order that Mq can be unambiguously identified, the following conditions must be satisfied:

$$2(p-1) > \lceil y \rceil \quad (2)$$

where $\lceil y \rceil$ denotes a smallest integer larger than or equal to y, and p is a number of bits representing the RTS.

The RTS of p-bits may be generated by the circuitry of FIG. 3. The network clock frequency, fn, is divided by the preselected integer, x, to form the derived network clock frequency, fnx. The derived network clock frequency is used to clock p-bit counter Ct. The output of counter Ct is provided to a latch. The latch is clocked by the output of counter A which divides the service clock frequency, fs, by N.

In ITU-T recommendation I.363, a 4-bit RTS value is transmitted in a serial bit stream provided by a convergence sublayer I (CSI) bit in successive data transmission headers. A modulo-8 sequence count provides a frame structure over the cell stream. Out of eight consecutive cells, four of the cells (i.e. cells with odd sequence counts) carry the CSI bit, thereby providing a four-bit time stamp over eight cells.

While both the buffer filling and time stamp methodology work well in point-to-point connections, these two methods are not directly applicable to multimedia applications which require multipoint-multipoint connections. When more than two users are involved in a communication operation, one prior art approach has been to designate a signal node as a master and distribute its local service clock to all others is the group. While this methodology is typically used in multipoint-multipoint connections, several limitations exist. In particular, when the master decides to leave the group, control must be transferred from the master to another node. Furthermore, failures at the node at which the master resides will cause significant problems to the service quality before it is realized that there is no clock distribution and control should be transferred to another node. To alleviate such delays, protocols are required to detect these situations and to transfer control to nodes other than the master node.

Additionally, a second approach utilizes a single buffer for the traffic arriving from all nodes when a buffer filling method can be utilized. In this buffer filling methodology, a buffer level fluctuation may result in fluctuations in the clocks generated by each PLL more than that of point-to-point communication scenarios. Such fluctuations may then result in unstable circuits. Alternatively, separate buffers may be used for each connection. In addition to the obvious scalability problems, a fluctuation problem will still result from this third alternative.

Therefore, a need exists for a method for synchronizing local service clocks of nodes involved in multipoint-multipoint communication systems in an efficient and effective manner.

SUMMARY OF THE INVENTION

The previously mentioned needs are fulfilled with the present invention. Accordingly, there is provided, in a first form, a receiver in a communication system including a plurality of data processors. The receiver includes an input circuit for receiving a first input signal from a first one of the plurality of data processors. A time stamp detector is connected to the input means for receiving the first input signal. The time stamp detector detects a time stamp value in the first input signal. A comparator is connected to the time stamp detector for receiving the time stamp value. The comparator compares the time stamp value with a local clock signal to determine a relative speed of the time stamp value and the local clock signal. An output circuit is connected to the comparator for selectively transmitting a new local clock signal to each of the plurality of data processors in response to the relative speed of the time stamp value and the local clock signal.

Additionally, there is provided, in a second form, a method for synchronizing a plurality of data processing systems in a communication network. The method includes the steps of receiving an input signal from a first one of the plurality of data processing systems. A time stamp detector is enabled to detect a time stamp value in the first input signal. The time stamp value is compared with a local clock signal to determine when a relative speed of the time stamp value and the local clock signal. A new local clock signal is selectively transmitted to each of the plurality of data processors in response to the relative speed of the time stamp value and the local clock signal.

Furthermore, there is provided, in a third form, a data processor for communicating with the plurality of data processors in a communication network. The data processor includes the transmitter. The transmitter includes an internal clock for generating a first clock signal and a time stamp generator. The time stamp generator is connected to the internal clock for receiving the first clock signal and for inserting a time stamp information value in the first clock signal to generate a new local clock signal. The data processor also includes a receiver. The receiver includes an input circuit for selectively receiving a first data input signal from a first one of the plurality of data processors. A time stamp detector is connected to the input circuit for receiving the first data input signal. The time stamp detector detects a time stamp value in the first input signal. A comparator is connected to the time stamp detector for receiving the time stamp value. The comparator compares the time stamp value with the first clock signal to determine a relative speed of the time stamp value and the first clock signal. An output circuit is connected to the comparator for selectively transmitting a new local clock signal to each of the plurality of data processors in response to the relative speed of the time stamp value and the first clock signal.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 1-A illustrates, in a timing diagram form, a timing relationship when a receiver clock and a server clock have a same frequency;

FIG. 1-B illustrates, in timing diagram form, a timing relationship when a receiver has a faster clock than a sender;

FIG. 1-C illustrates, in timing diagram form, a timing relationship between a receiver having a slower clock than a sender;

DETAILED DESCRIPTION

Figure 2:
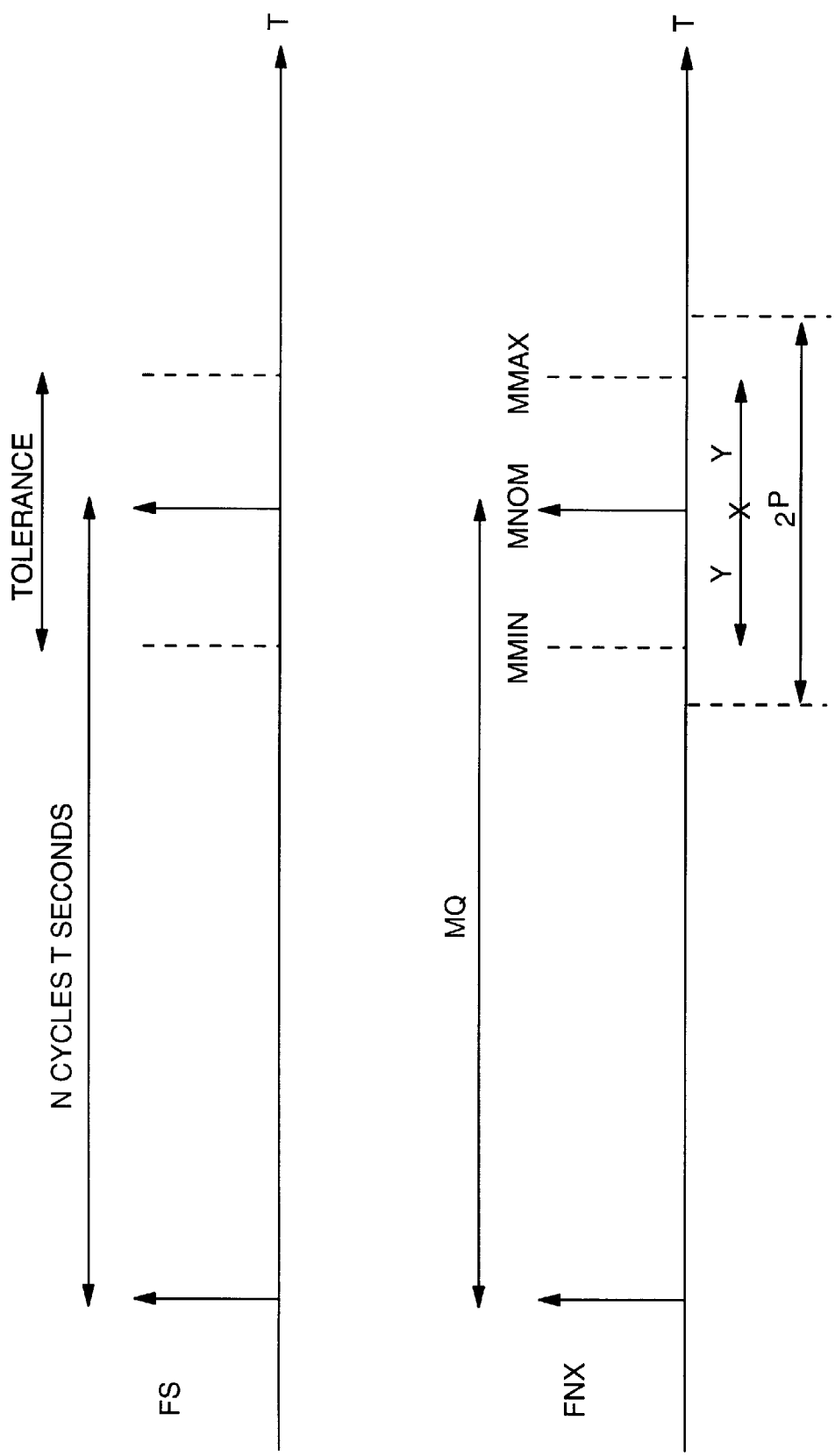
FIG. 2 illustrates, in timing diagram form, a concept of a synchronous residual time stamp in accordance with ITU-T recommendation I.363.
Figure 3:
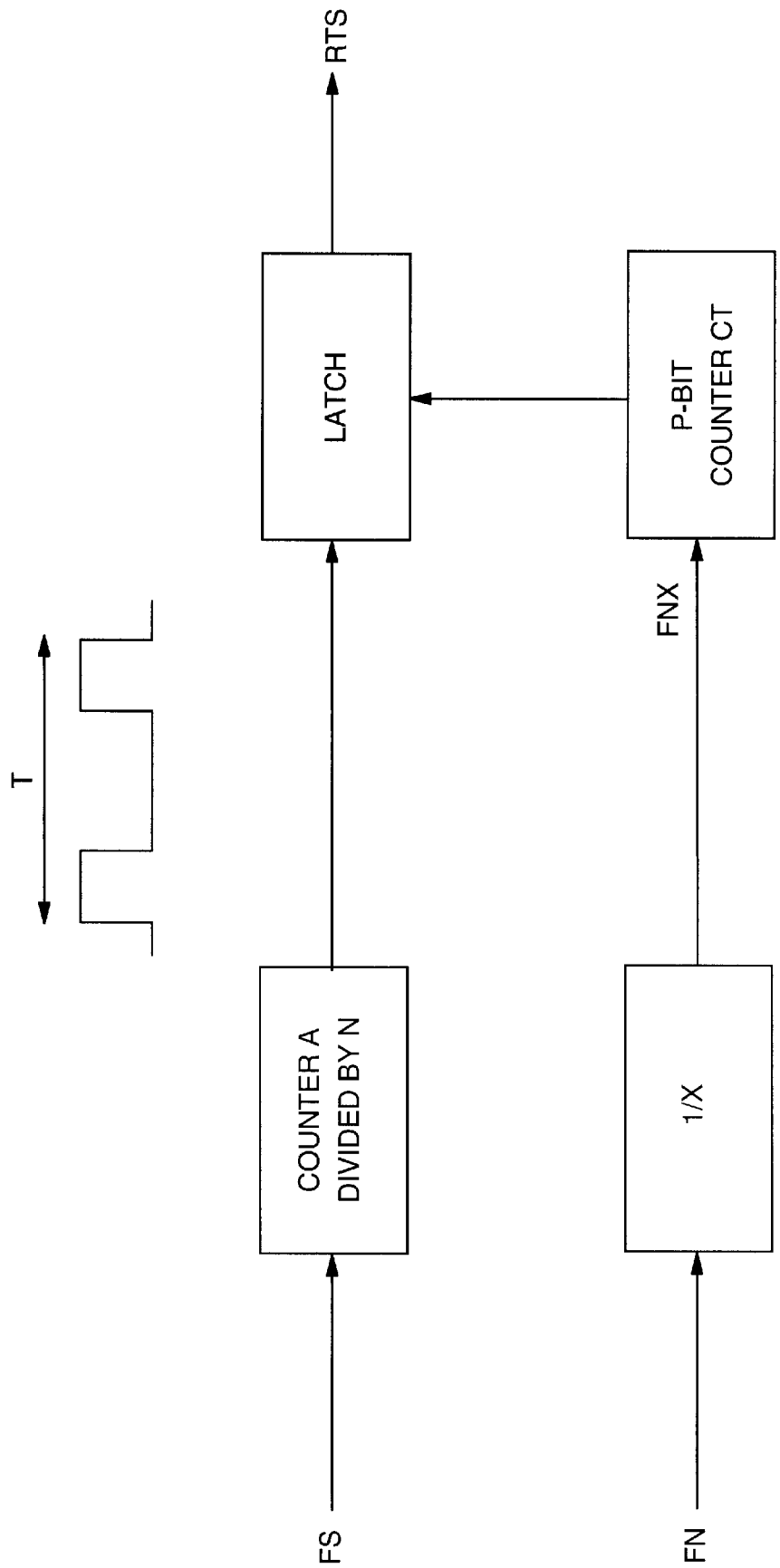
FIG. 3 illustrates, in block diagram form, a circuit for generating a residual time stamp in accordance with ITU-T recommendation I.363.

The present invention implements a circuit and method for allowing two or more members of a network, connected in a multipoint-multipoint manner, to synchronize their local service clocks. Overall synchronization is achieved as soon as every member transports its own timing information to other members of the group (plus a maximum propagation delay between the group members) and, accordingly minimizes the possibility of underruns and overruns at each node end. The present invention implements such synchronization by synchronizing all members of a network to a lowest clock frequency. An apparatus and method for performing this operation will subsequently be described in greater detail.

To describe operation of the present invention, some parameters of an environment in which it is implemented will be described herein. First, it should be noted that the synchronization among each element of the network is performed in a distributed fashion, and there is no central synchronization authority. Additionally, among the boundaries introduced by the environment of the present invention are those constraints relative to clocking mechanisms of each of the components of the network. Therefore, it should be noted that relative to a network clock, some local service clocks within a group are faster and some are slower. Slower clocks are less problematic than faster clocks because the negative impact of slower clocks can be compensated for a short period of time with the use of buffers when service clocks are synchronized quickly and a buffer does not overflow. In contrast, with faster clocks, packets may be considered lost by the receiver if it expects more data than it is receiving and this may result in the loss of synchronization between the transmitter and receiver, unless there are lost packet handling procedures at the receivers. For these reasons, the present invention recognizes that it is better to attempt to synchronize all local clocks to a slowest local clock rather than a fastest local clock. Furthermore, the logic required to implement synchronization to the slowest local clock is simpler and may be implemented with less complexity. As well, in the environment of the present invention, when clock synchronization is to be achieved in a distributed fashion between more than two users, not all local clocks will be synchronized simultaneously due to propagation delays in the network. Additionally, each member of a communication network has a capability of either sending a time stamp or initializing a phase lock loop register to be faster than any other clock in the network. As well, every member in the communication network has a capability to slow down or increase the speed of its local clock.

The present invention implements each of these environmental aspects and achieves clock synchronization between group members quickly and efficiently. Additionally, the present invention effectively synchronizes clocks between multiple members of a communications group, independent of a type of application which is being executed. Therefore, the clock synchronization techniques and circuit of the present invention are equally useful for multipoint-multipoint connections with symmetric traffic, and multipoint-multipoint connections with non-symmetric traffic. Before discussing operation of the present invention in greater detail, a description of connectivity will be given below.

In that description of connectivity, it should be noted that numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. Additionally, for the most part, details concerning timing considerations and the like have been omitted inasmuch as such details are not necessary to obtain a complete understanding of the present invention and are within the skills of persons of ordinary skill in the relevant art. Furthermore, during the description of the implementation of the present invention, the terms "assert" and "negate" and various grammatical forms thereof, are used to avoid confusion when dealing with the mixture of "active high" and "active low" logic signals. "Assert" is used to refer to the rendering of logic signal or register bit into its active, or logically true state. "Negate" is used to refer to the rendering of a logic signal or register bit into its inactive, or logically false state. Additionally, a hexadecimal value may be indicated by a "$" symbol proceeding a value.

Description of Connectivity

Figure 4:
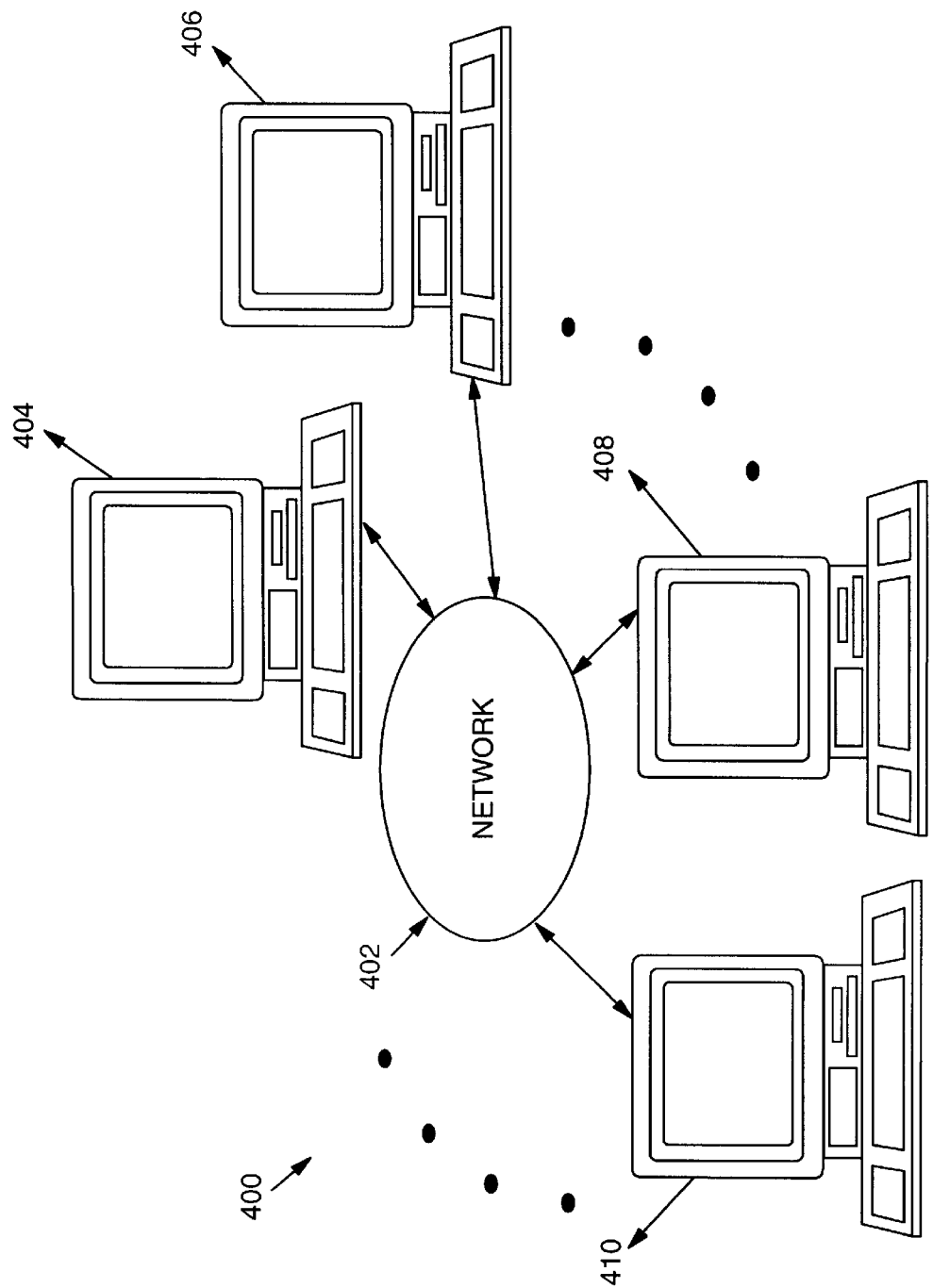
FIG. 4 illustrates, in block diagram form, a network in accordance with one embodiment of the present invention.

Refer now to FIG. 4 which illustrates a multipoint-multipoint communication network 400. Communication network 400 comprises a network 402 and a plurality of data processors 404–410. Each of the plurality of data processors 404–410 is bidirectionally coupled to network 402 to communicate information with one another, as well as other data processing elements not illustrated herein. Operation of such a multipoint to multipoint communication network is well-known to those with skill in the relevant art and, therefore, will not be described in greater detail herein. However, for additional information, refer to ITU-T recommendation I.363, which has been previously incorporated by reference herein.

Figure 5:
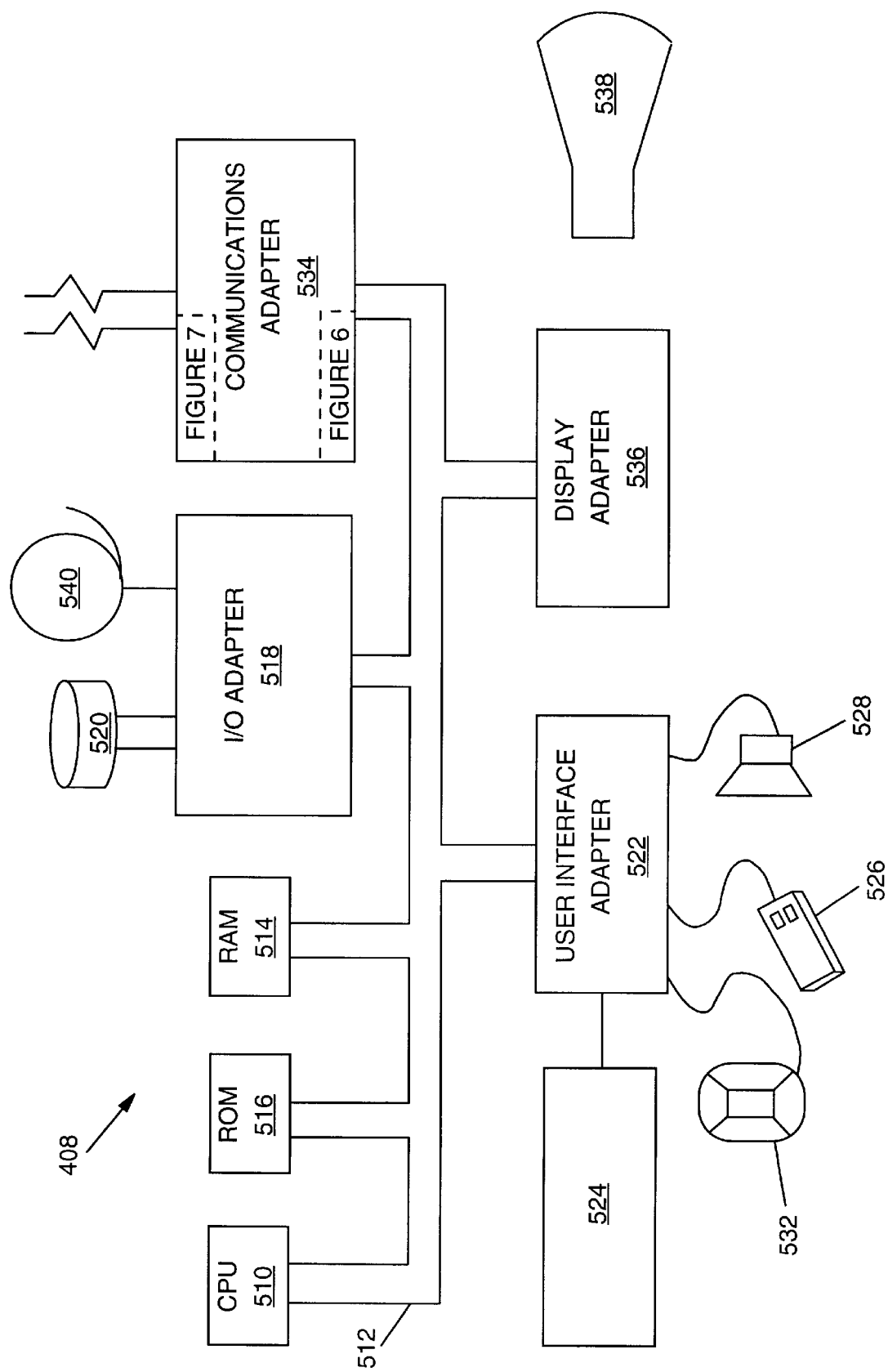
FIG. 5 illustrates, in block diagram form, a data processing system in accordance with one embodiment of the present invention.

FIG. 5 illustrates data processing system 408 in greater detail. Referring first to FIG. 5, an example is shown of a data processing system 500 which may be used for the invention. The system has a central processing unit (CPU) 510, such as a PowerPC microprocessor ("PowerPC" is a trademark of IBM Corporation) according to "The PowerPC Architecture: A Specification for a New Family of RISC Processors", 2d edition, 1994, Cathy May, et al. Ed., which is hereby incorporated herein by reference. A more specific implementation of a PowerPC microprocessor is described in the "PowerPC 604 RISC Microprocessor Users Manual", 1994, IBM Corporation, which is hereby incorporated herein by reference. The history buffer (not shown) of the present invention is included in CPU 510. The CPU 510 is coupled to various other components by system bus 512. Read only memory ("ROM") 516 is coupled to the system bus 512 and includes a basic input/output system ("BIOS") that controls certain basic functions of the data processing system 500. Random access memory ("RAM") 514, I/O adapter 518, and communication adapter 534 are also coupled to the system bus 512. I/O adapter 518 may be a small computer system interface ("SCSI") adapter that communicates with a disk storage device 520. Communication adapter 534 interconnects bus 512 with an outside network enabling the data processing system to communication with other such systems. Input/Output devices are also connected to system bus 512 via user interface adapter 522 and display adapter 536. Keyboard 524, track ball 532, mouse 526 and speaker 528 are all interconnected to bus 512 via user interface adapter 522. Display monitor 538 is connected to system bus 512 by display adapter 536. In this manner, a user is capable of inputting to the system throughout the keyboard 524, trackball 532 or mouse 526 and receiving output from the system via speaker 528 and display 538. Additionally, an operating system such as AIX ("AIX" is a trademark of the IBM Corporation) is used to coordinate the functions of the various components shown in FIG. 5.

Preferred implementations of the invention include implementations as a computer system programmed to execute the method or methods described herein, and as a computer program product. According to the computer system implementation, sets of instructions for executing the method or methods are resident in the random access memory 514 of one or more computer systems configured generally as described above. Until required by the computer system, the set of instructions may be stored as a computer program product in another computer memory, for example, in disk drive 520 (which may include a removable memory such as an optical disk or floppy disk for eventual use in the disk drive 520). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

Figure 6:
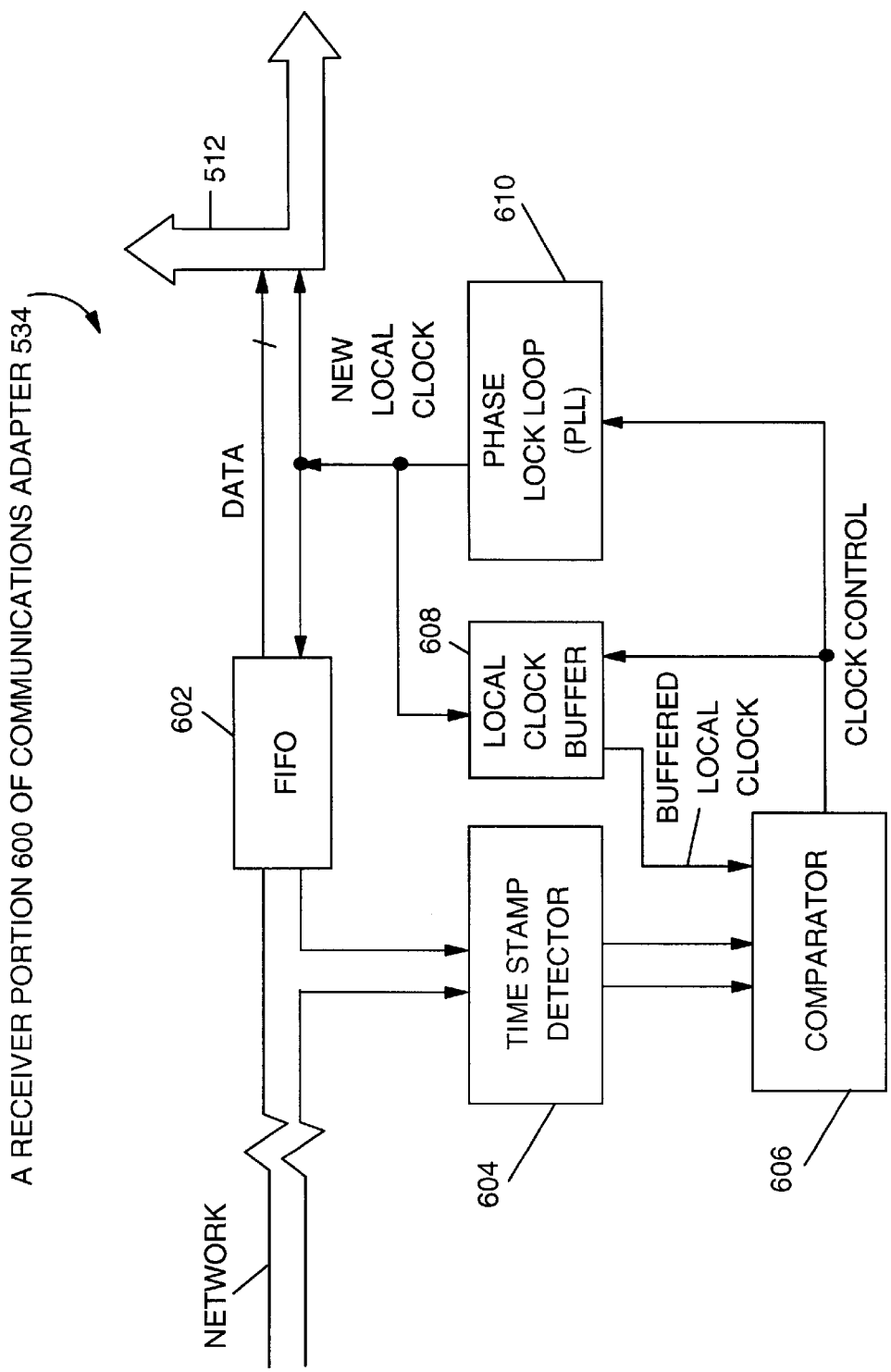
FIG. 6 illustrates a receiver portion of a communications adapter of FIG. 5.

FIG. 6 illustrates a receiver portion 600 of communication adapter 534. The receiver portion 600 comprises a FIFO (first in first out) buffer 602, a time stamp detector 604, a comparator 606, a local clock buffer 608, and a phase lock loop (PLL) circuit 610. The network is coupled to both FIFO 602 and time stamp detector 604. Time stamp detector 604 is coupled to comparator 606. Comparator 606 is coupled to local clock buffer 608 and PLL 610 to provide a Clock Control signal. PLL 610 is coupled to FIFO 602 and bus 512 via a Local Clock signal. FIFO 602 is coupled to bus 512 via a data bus.

Figure 7:
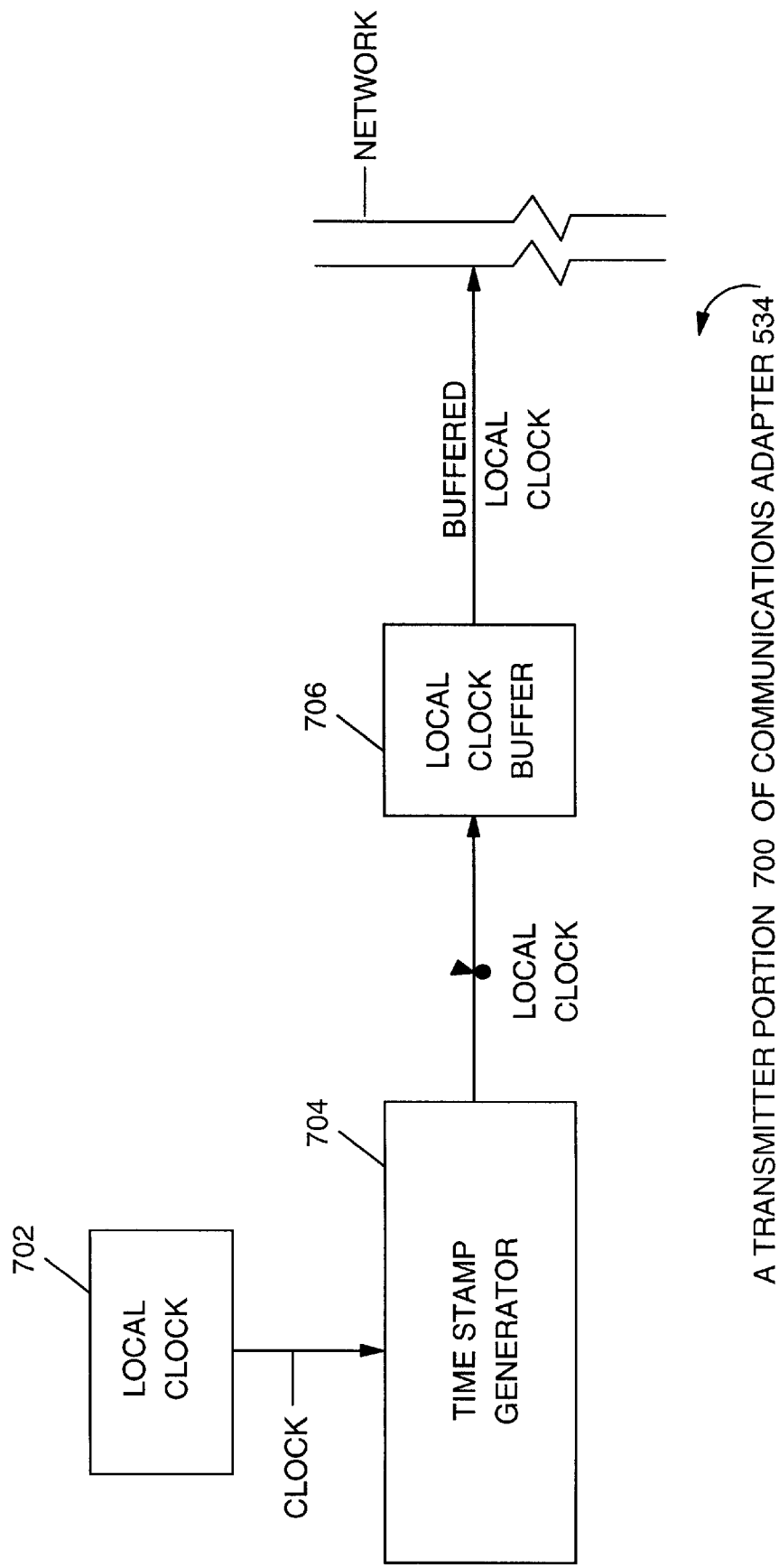
FIG. 7 illustrates, in block diagram form, a transmitter portion of a communications adapter of FIG. 6.

FIG. 7 illustrates a transmitter portion 700 of communication adapter 534. Transmitter portion 700 comprises a local clock generator 702, a time stamp generator 704, and a local clock buffer 706. Local clock generator 702 is coupled to time stamp generator 704 to provide a Clock signal. Time stamp generator 704 is coupled to local buffer 706 to provide a local Clock signal. Local clock buffer 706 is coupled to the network connection to provide a buffered local Clock signal.

Operation of the present invention using the configurations illustrated herein and described above will subsequently be described in greater detail.

Description of Operation

Assume, during operation of multipoint to multipoint communication network 400, data is communicated between each of the plurality of data processors 404–410 using a communications protocol, such as that described in ITU-T Recommendation I.363. It should be noted that other communication protocols may also be used in the present invention. Furthermore, it should be noted that each of the plurality of data processing systems coupled to network 402 of FIG. 4 selectively comprises a receiver portion and a transmitter portion such as those illustrated in FIGS. 6 and 7.

To begin discussing operation of the present invention, assume that data is received by a receiver portion (600 of FIG. 6) of communications adapter 534 within one of the plurality of data processing systems. Assume that receiver portion 600 of communications adapter 534 (illustrated in FIG. 6) receives clock information from another one of the data processing systems within communication network 400. When the receiver portion 600 of communications adapter 534 receives data information, including a time stamp in an appropriate location of the protocol as defined by a relevant communication standard (such as ITU-T Recommendation I.363), time stamp detector 604 detects that value and provides that value to comparator 606. Time stamp detector 604 receives data in a bit stream and determines where packets of information are located within that bit stream. In the present invention, time stamp detector 604 looks at data received from the incoming bit stream to determine a sequence number. A manner for performing such determinations is well-known to those with skill in the data processing art and will not be described in detail herein.

Comparator 606 compares the information derived from a time stamp of input data with a buffered local clock signal provided by local clock buffer 608. Comparator 606 then determines whether the clock information derived from the time stamp of the input data represents a frequency which is slower or faster than the buffered local clock signal. Comparator 606 provides a Clock Control signal in response to this comparison operation. If the time stamp value derived from the data provided to the receiver portion 600 is slower than the internal clock of receiver portion 600 (also referred to as Local Clock), then comparator 606 asserts the Clock Control signal to PLL 610 to enable PLL 610 to provide a Local Clock signal to a remaining portion of communications adapter 534 and data processing system 408 at a lower frequency which corresponds to the frequency of the data provided from an external data processing system within communication network 400. Additionally, comparator 606 asserts the Clock Control signal to enable local clock buffer 608 to store the new, modified Local Clock signal provided by PLL 610 after PLL 610 has provided the signal at a lower frequency.

Conversely, if the time stamp value derived by time stamp detector 604 indicates that a current Local Clock signal is slower than the time stamp value derived from the incoming data, comparator 606 negates the Clock Control signal such that PLL 610 continues to provide the current Local Clock signal at a current frequency. Additionally, Local Clock buffer 608 continues to store information associated with the current Local Clock signal, and does not store the new time stamp information. Rather, the new time stamp information is disregarded.

A new Local Clock signal is subsequently provided to bus 512 and used to "clock in" data to FIFO 602 from a network connection. Thus, the new Local Clock signal, whether a previous Local Clock signal or a modified Local Clock signal, is subsequently utilized to provide timing information for functions performed within the data processing system 408.

This process of comparison and update continues at periodic rates during operation of the receiver portion 600 of communications adapter 534 to ensure that each of the data processing systems within communication network 400 is synchronized quickly and with minimal implementation complexity. The periodic rate at which this process is executed is dependent upon a circuit type which is implemented. For example, some circuits are constant rate circuits with a predetermined periodicity. Additionally, when a constant rate circuit is not utilized, alternate means are used to determine the periodicity using well-known data processing techniques.

When a data processing system, such as data processing system 408, initiates a data transfer operation, a transmitter portion 700 of communications adapter 534 of data processing system 408 prepares time stamp information to be transmitted with the data according to a time stamp generation protocol set forth in ITU-T Recommendation I.363. A local clock generation circuit 702 provides a clock signal to time stamp generator 704. Time stamp generator 704 subsequently prepares time stamp information which it passes to local clock buffer 706 at the Local Clock signal. Local clock buffer 706 subsequently provides a buffer local clock signal to a remaining portion of communication network 400.

By implementing the protocols using the circuitry and methodology described above, only one station is required to send a time stamp to achieve synchronization in the network. This time stamp, when received by all others, will be used to set a clock signal for the network, when that time stamp is lower than all other lower clock signals within the network. Furthermore, the synchronization process is achieved substantially immediately after a time stamp is sent by each node and received by all nodes. It should be noted that the time for all nodes to synchronize is proportional to the order of a largest propagation delay between the communicating entities within the communication network 400. Thus, it may be observed that nodes that do not send time stamp information are easily synchronized by initializing their Local Clock buffers to a fastest clock information value periodically. This mechanism eliminates the possibility of stations which do not generate traffic (in time stamps) from having a slower clock rate than others within the communication network 400. Lastly, the implementation of the present invention has minimal complexity, but provides significant and substantial savings in synchronization of all elements within a communication network.

Figure 8:
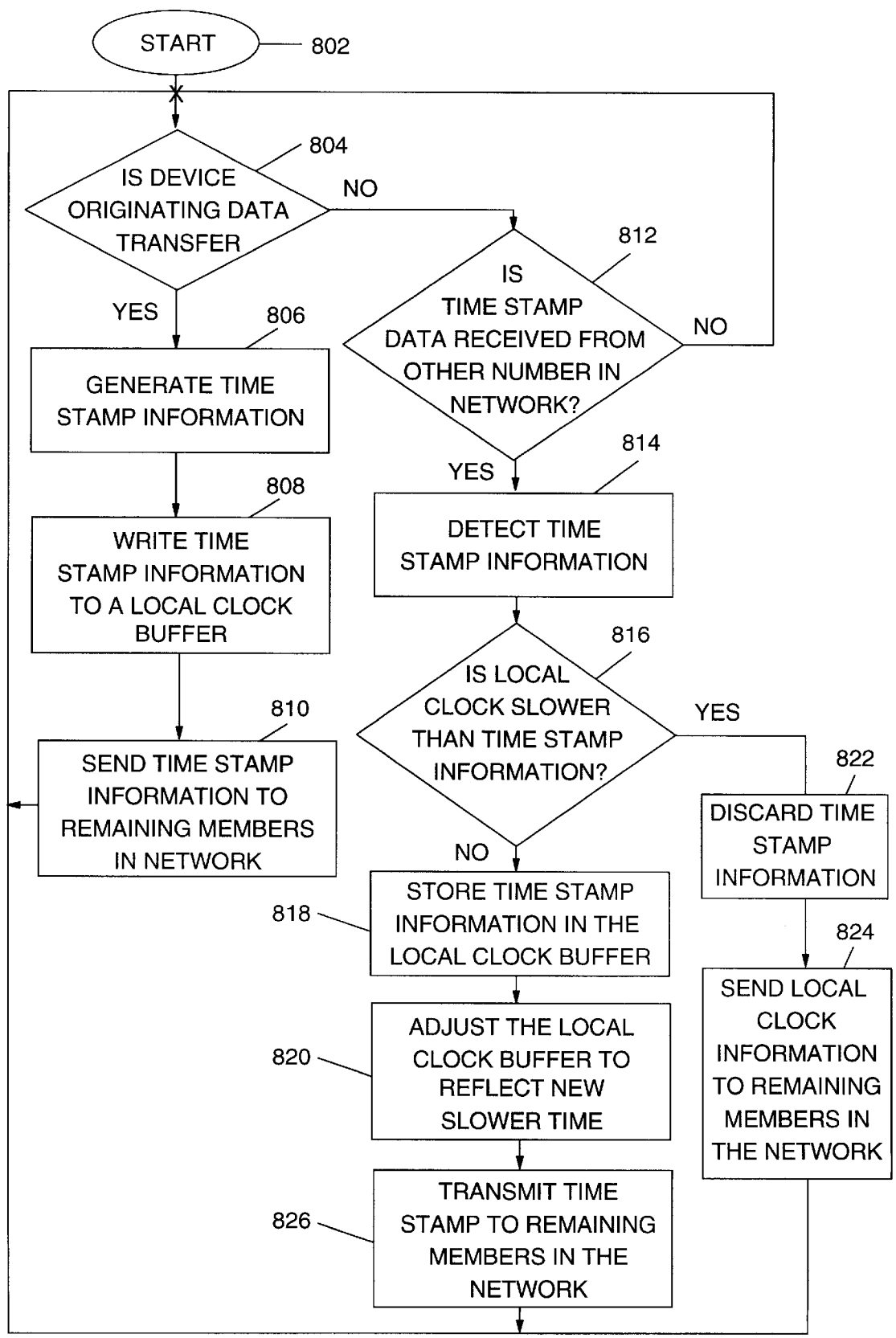
FIG. 8 illustrates, in flow diagram form, a methodology implementing one embodiment of the present invention.

FIG. 8 provides a summarization of the steps it used to implement one embodiment to the present invention. As illustrated in FIG. 8, operation of communication network 400 initiates in step 802. Subsequently, in step 804, each of the plurality of data processing systems, such as data processing system 408, determines whether it is originating a data transfer. If the data processing system is originating a data transfer operation, the data processing system will generate time stamp information in accordance with well-known principals in step 806. Additionally, in step 808, the data processing system generating the data transfer will write that time stamp information to a Local Clock buffer. Additionally, in a step 810, the data processing system will send the time stamp information to remaining members in communication network 400.

If, however, the data processing system is not originating a data transfer, the data processing system determines whether time stamp data is received from another member in communication network 400. If time stamp data is received from another member of the network, the data processing system detects the time stamp information using time stamp detector 604 in a step 814. Subsequently, a comparator is utilized to determine whether the Local Clock is slower than the time stamp information. If the Local Clock is slower than the time stamp information, the time stamp information is discarded in Step 822. Subsequently, the Local Clock information is sent to remaining members within communication network 400 in step 824, However, if the Local Clock is not slower than the time stamp information, the time stamp information is stored in the Local Clock buffer in step 818. Subsequently, the Local Clock buffer is adjusted to reflect a new slower clock frequency, and the time stamp is sent to the remaining members within network 400, in step 826. After the completion of each of steps 810, 826, and 824, a program play returns to set 802.

While there have been described herein the principles of the invention, it is to be clearly understood to those skilled in the art that this description is made by way of example only and not as a limitation to the scope of the invention. Accordingly, it is intended, by the appended claims, to cover all modifications of the invention which fall within the true spirit and scope of the invention.

What is claimed is:

1. A receiver in a communication system comprising a plurality of data processors, wherein the receiver comprises:

input means for receiving a first input signal from a first one of the plurality of data processors;

a time stamp detector coupled to the input means for receiving the first input signal, the time stamp detector detecting a time stamp value in the first input signal;

a comparator coupled to the time stamp detector for receiving the time stamp value, the comparator comparing the time stamp value with a local clock signal to determine a relative speed of the time stamp value and the local clock signal; and an output means coupled to the comparator for selectively transmitting a new local clock signal to each of the plurality of data processors in response to the relative speed of the time stamp value and the local clock signal.

2. The receiver of claim 1 wherein the output means transmits the local clock signal to each of the plurality of data processors as the new local clock signal when a frequency of the time stamp value is faster than a frequency of the local clock signal.

3. The receiver of claim 1 wherein the output means selectively transmits a frequency of the time stamp value to each of the plurality of data processors as the new local clock signal when the frequency of the time stamp value is slower than a frequency of the local clock signal.

4. The receiver of claim 3 wherein the output means is a phase lock loop circuit.

5. The receiver of claim 1, further comprising:

storage means for storing a plurality of data values received from the first one of the plurality of data processors, wherein the storage means stores the plurality of data values in response to a frequency of the new local clock signal.

6. The receiver of claim 1, wherein the time stamp detector detects the time stamp value in accordance with a time stamp generation protocol defined by ITU-T Recommendation I.363.

7. A method for synchronizing a plurality of data processing systems in a communication network, comprising the steps of:

receiving a first input signal from a first one of the plurality of data processing systems;

enabling a time stamp detector to detect a time stamp value in the first input signal;

comparing the time stamp value with a local clock signal to determine a relative speed of the time stamp value and the local clock signal; and selectively transmitting a new local clock signal to each of the plurality of data processors in response to the relative speed of the time stamp value and the local clock signal.

8. The method of claim 7, further comprising the step of:

transmitting the local clock signal to each of the plurality of data processing systems as the new local clock signal when a frequency of the time stamp value is faster than a frequency of the local clock signal.

9. The method of claim 7, further comprising the step of:

transmitting a frequency of the time stamp value to each of the plurality of data processing systems as the new local clock signal when the frequency of the time stamp value is slower than a frequency of the local clock signal.

10. The method of claim 7, further comprising the step of:

storing a plurality of data values received from the first one of the plurality of data processing systems, in response to a frequency of the new local clock signal.

11. The method of claim 7, further comprising the steps of:

determining when a selected one of the plurality of data processing systems transmits a first plurality of data values;

enabling the selected one of the plurality of data processing systems to generate a time stamp information value; and enabling the selected one of the plurality of data processing systems to transmit the time stamp information value to each of the plurality of data processing systems.

12. The method of claim 11, further comprising the steps of:

determining when a portion of the plurality of data processing systems refrain from transmitting a corresponding time stamp information value; and initializing an internal clock of each of the portion of the plurality of data processing systems to a fastest local clock frequency.

13. The method of claim 12 wherein at step of initializing is performed periodically.

14. A data processor for communicating with a plurality of data processors in a communication network, comprising:

a transmitter, comprising:
an internal clock for generating a first clock signal; and
a time stamp generator coupled to the internal clock for receiving the first clock signal and for inserting a time stamp information value in the first clock signal to generate a new local clock signal; and a receiver, comprising:
input means for selectively receiving a first data input signal from a first one of the plurality of data processors;
a time stamp detector coupled to the input means for receiving the first data input signal, the time stamp detector detecting a time stamp value in the first input signal;
a comparator coupled to the time stamp detector for receiving the time stamp value, the comparator comparing the time stamp value with a local clock signal to determine a relative speed of the time stamp value and the local clock signal; and
an output means coupled to the comparator for selectively transmitting a new local clock signal to each of the plurality of data processors in response to the relative speed of the time stamp value and the local clock signal.

15. The data processor of claim 14 wherein the output means transmits the local clock signal to each of the plurality of data processors as the new local clock signal when a frequency of the time stamp value is faster than a frequency of the local clock signal.

16. The data processor of claim 14 wherein the output means selectively transmits a frequency of the time stamp value to each of the plurality of data processors as the new local clock signal when the frequency of the time stamp value is slower than a frequency of the local clock signal.

17. The data processor of claim 16 wherein the output means is a phase lock loop circuit.

18. The data processor of claim 14, further comprising:

storage means for storing a plurality of data values received from the first one of the plurality of data processors, wherein the storage means stores the plurality of data values in response to a frequency of the new local clock signal.

19. The data processor of claim 17 wherein each of the plurality of data processors synchronizes to the new local clock signal when the new local clock signal has a lower frequency than an internal clock of each of the plurality of data processors.

20. The data processor of claim 17 wherein an internal clock of each of a portion of the plurality of data processors which refrain from transmitting a corresponding time stamp information value is initialized to a fastest local clock frequency.

* * * * *